W. W. WEITLING.
MACHINE FOR MAKING BATTERY JARS.
APPLICATION FILED MAY 26, 1916.
1,205,940.
Patented Nov. 21, 1916.
5 SHEETS—SHEET 1.
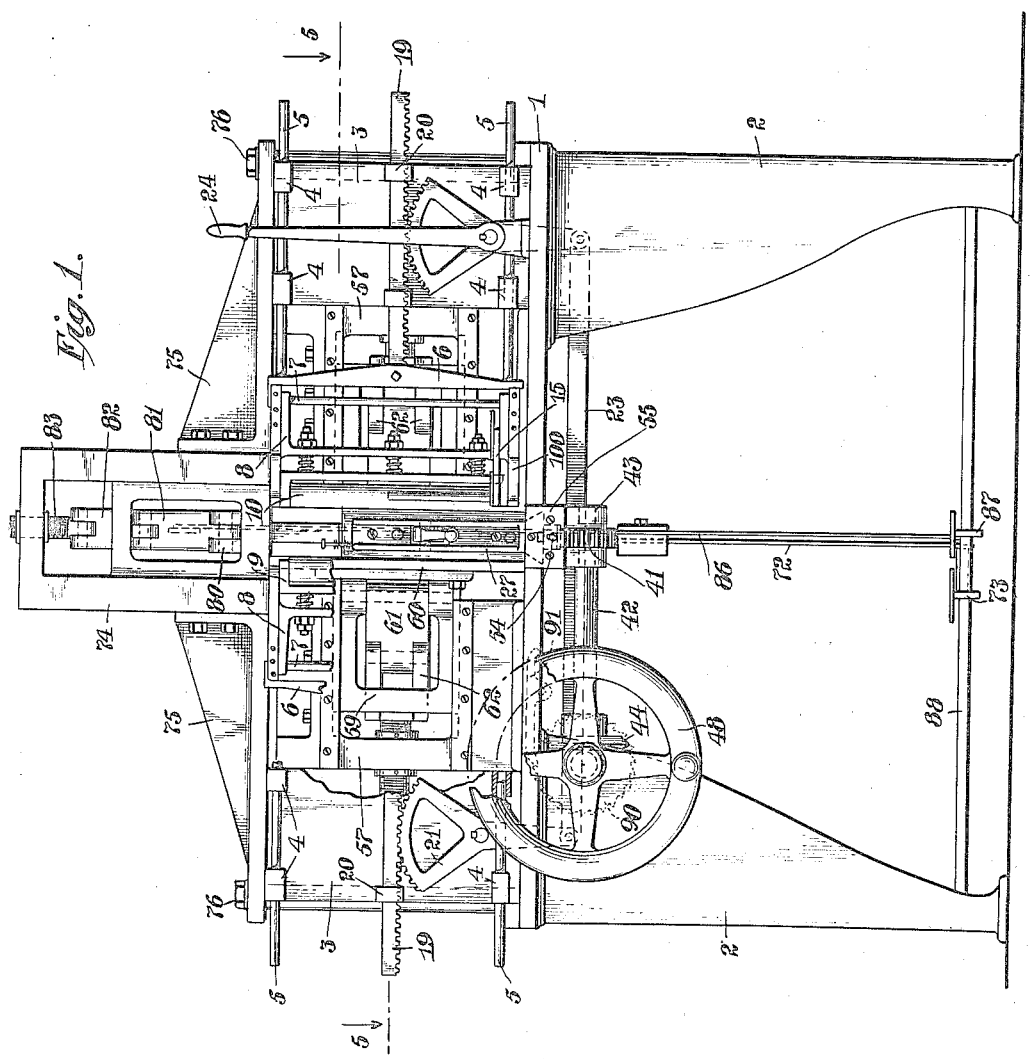

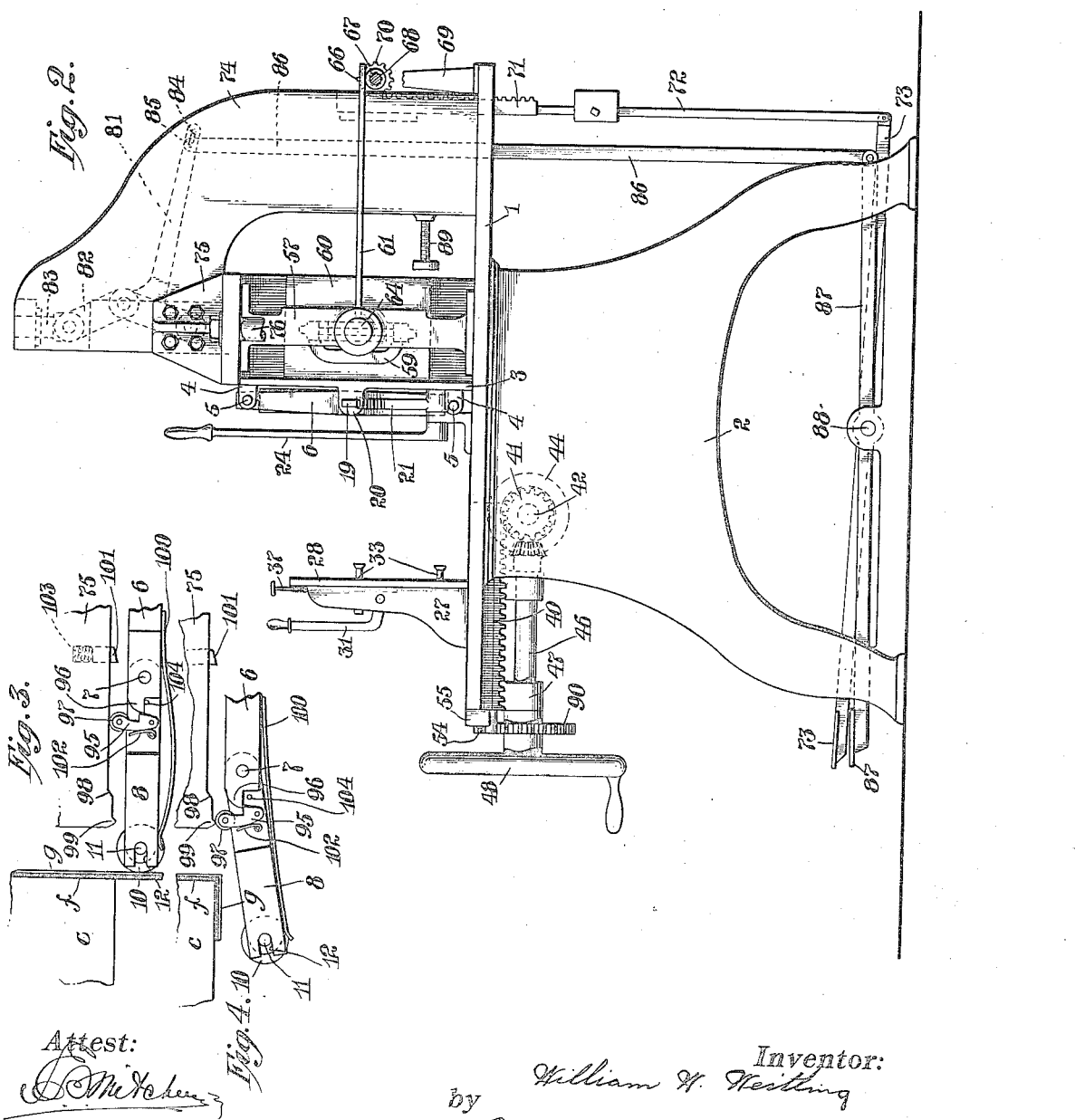

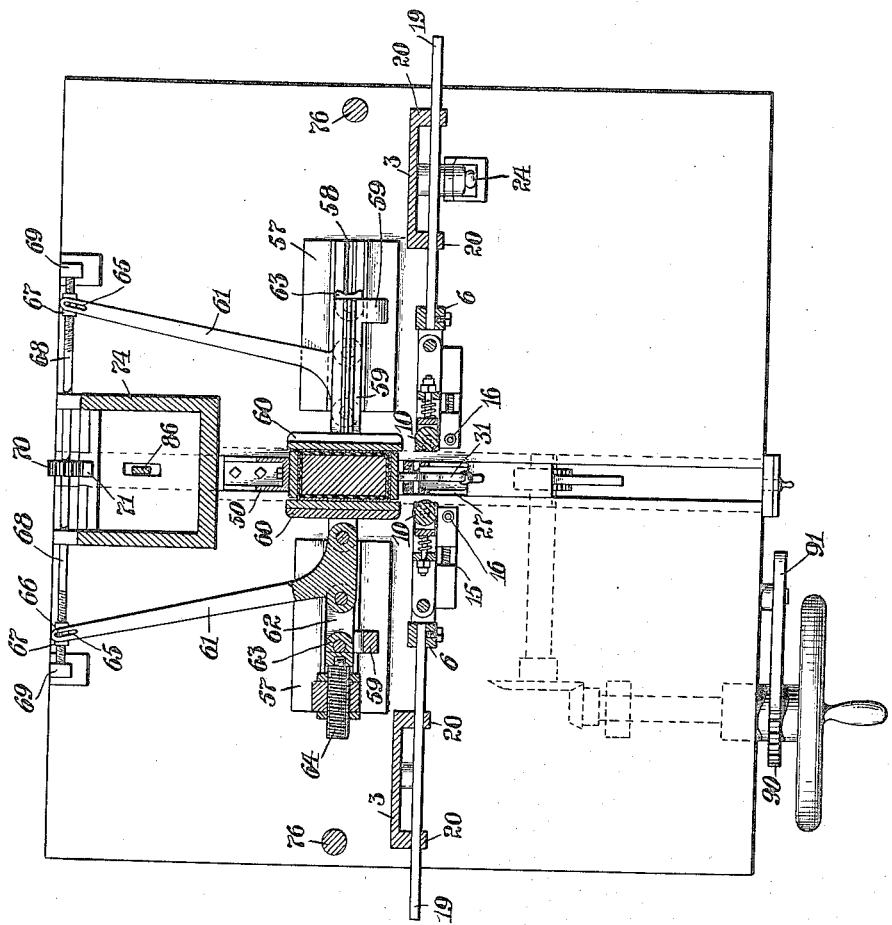

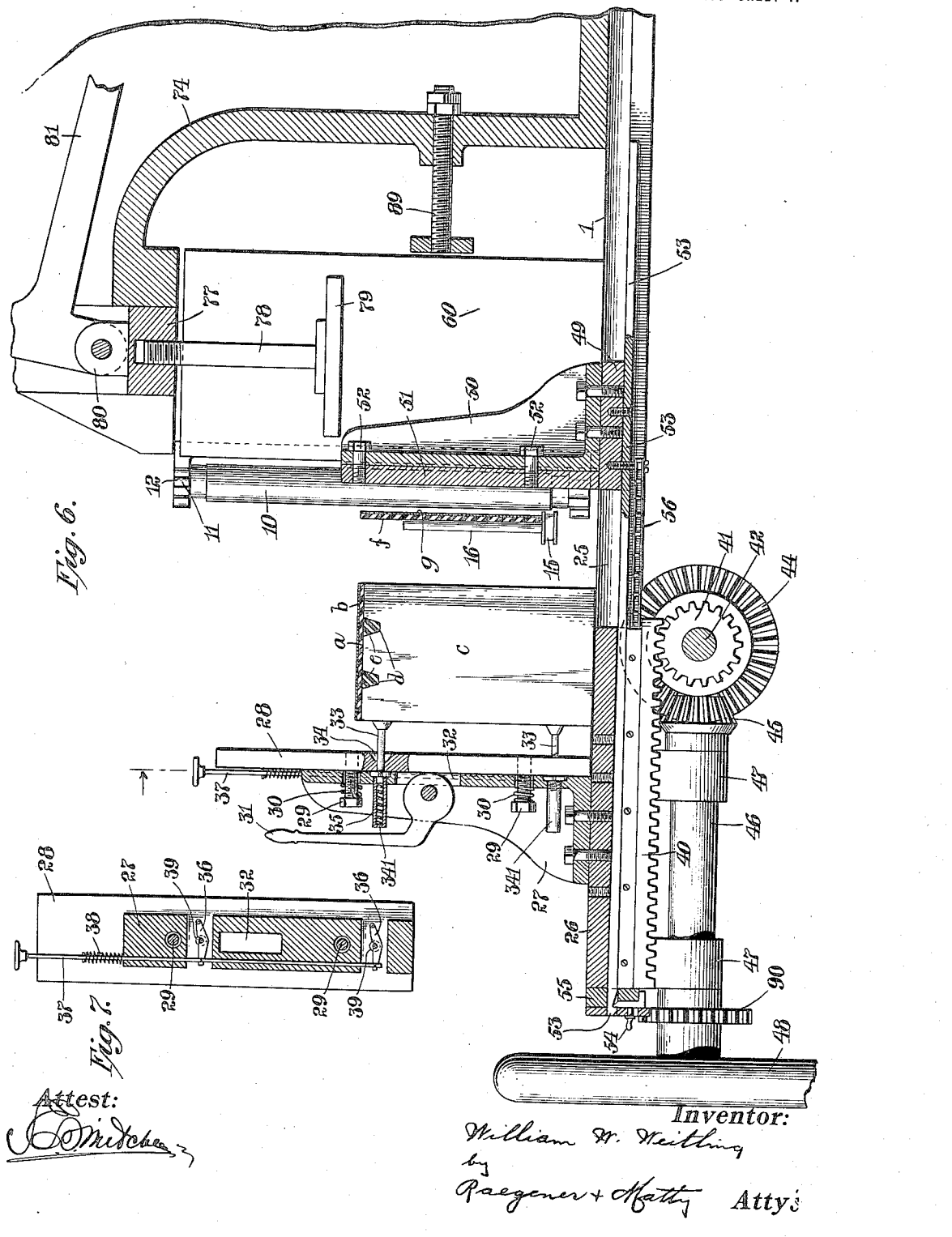

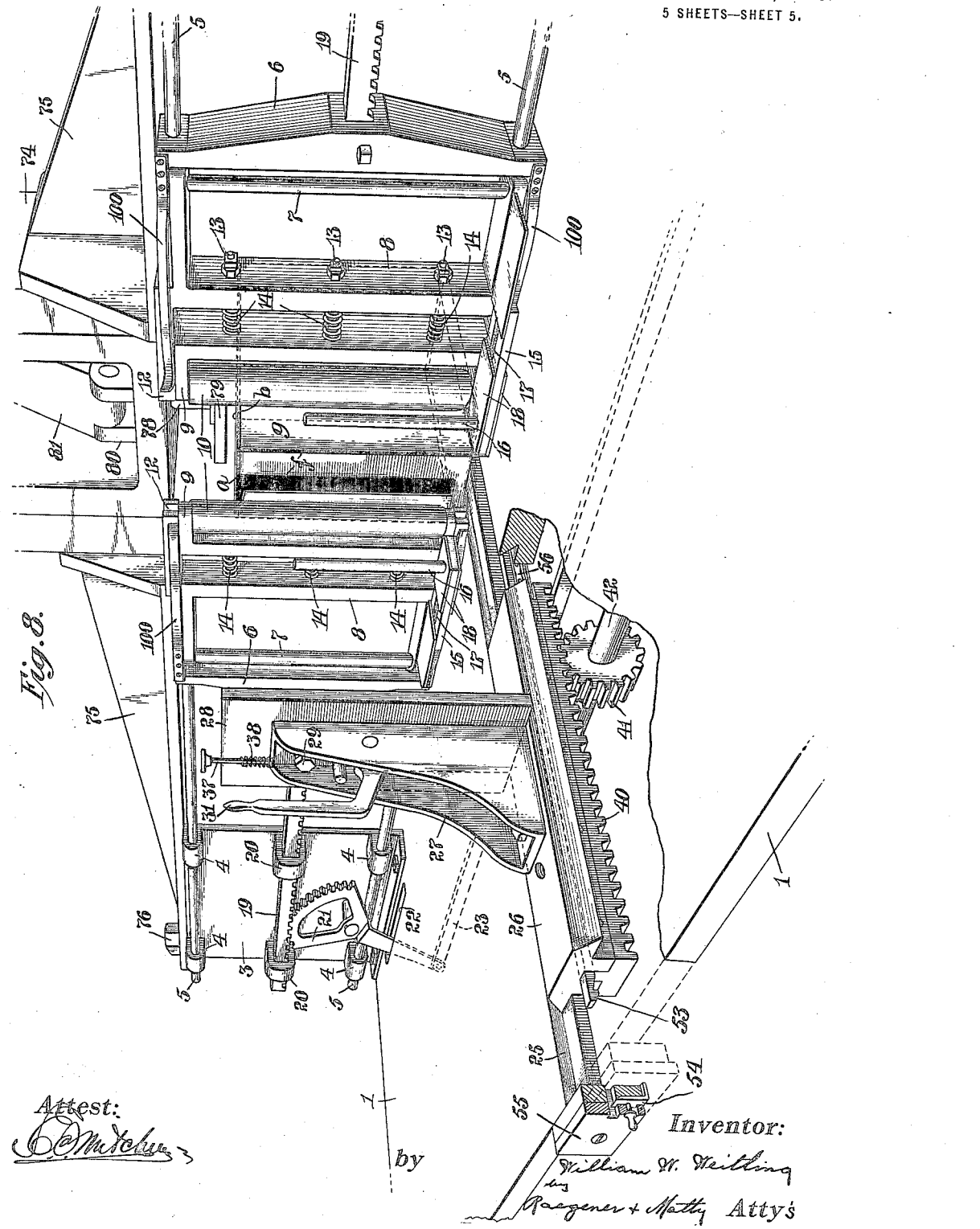

UNITED STATES PATENT OFFICE.

WILLIAM W. WEITLING, OF COLLEGE POINT, NEW YORK, ASSIGNOR TO AMERICAN HARD RUBBER CO., OF NEW YORK, N. Y., A CORPORATION OF NEW YORK.

MACHINE FOR MAKING BATTERY-JARS.

1,205,940.     Specification of Letters Patent.     Patented Nov. 21, 1916.

Application filed May 26, 1916. Serial No. 100,008.

*To all whom it may concern:*

Be it known that I, WILLIAM W. WEITLING, a citizen of the United States, and a resident of College Point, county of Queens, and State of New York, have invented certain new and useful Improvements in Machines for Making Battery-Jars, of which the following is a specification.

This invention relates to a machine for making battery jars or similar articles out of hard rubber, and the objects of the invention are to construct a machine that is adapted to fold sheets of rubber while in a plastic state about a suitable core.

Further objects of the invention are to construct a machine that is adapted to apply pressure, against the top and sides of the core covered by the rubber, in all directions at one and the same time, to firmly press the rubber into contact with the core and firmly unite all of the seams in the rubber to produce a battery jar free of seams and imperfections.

To the accomplishment of the above objects and to such others as may hereinafter appear, the invention comprises a machine provided with means for folding a sheet of rubber about the sides of a core the top of which is provided with a separate sheet of rubber, and means comprising a plurality of movable presser plates for applying pressure uniformly and in all directions to the sheets of rubber covering the core.

Referring to the drawings: Figure 1 is a front elevation of a machine made in accordance with the invention, a portion of one of the folders being broken away for clearness of illustration. Fig. 2 is a side elevation of the machine shown in Fig. 1 looking toward the left. Figs. 3 and 4 are enlarged detail views of the folders. Fig. 5 is a plan view of the machine partly in section on the line 5—5 of Fig. 1. Fig. 6 is an enlarged sectional view through the center of the machine looking toward the left of Fig. 1, some of the parts being broken away. Fig. 7 is an enlarged view of the back of the front presser plate showing the front standard in section. Fig. 8 is a perspective view of the front portion of the machine some of the parts being broken away.

In the drawings, 1 designates a suitable table supported in the present instance upon suitable uprights or standards 2. Suitably secured to the top of each side of the table in line with each other are upright guide members 3. Each guide member is in the present instance provided with upper and lower bearing lugs 4 in which are slidably mounted upper and lower supporting rods 5 both of which are secured at their inner ends to a bracket 6. The brackets 6 each pivotally support, by means of a pivot rod 7, a folder, which, in the present instance, comprises a folder frame 8 having movably mounted thereon a roller bracket 9, having a roller 10, provided with a roller shaft 11 the ends of which extend beyond the ends of the roller bracket so as to engage the slots 12 in the ends of the folder frame. The roller bracket 9 is also connected to the folder frame 8 by means of bolts 13 slidably connected thereto, the roller 10 being adapted to be forced inward against the action of suitable springs 14 mounted on the bolts 13.

The folder frames 8 are each provided along the bottom edge with a shelf 15 upon which is movably supported a guide post 16 the lower end of which passes through a longitudinal slot 17 in the shelf 15 and is held in position by means of upper and lower shelf plates 18.

In the present instance the brackets 6 are each connected to one end of a rack 19, the other end of which is movably supported in suitable lugs 20 secured to the upright guide member 3. Each rack 19 is arranged to engage a rack segment 21 pivoted in each instance to the guide member 3. The lower end of each rack segment 21 passes through a suitable slot 22 in the top of the table and is connected in each instance to opposite ends of a bar 23, a suitable hand lever 24 secured to one of the rack segments being provided for operating both racks 19 so as to move the folders back and forth the purpose of which will be described later.

The central portion of the table at right angles to the path of movement of the folders is provided in the present instance with a suitable dovetailed groove 25 in which is slidably mounted a slide 26 to the top surface of which is secured a front standard 27 which movably supports a front presser plate 28 through the medium of bolts 29 which pass freely through the front standard 27. In the present instance the front presser plate 28 is held in retracted position against the face of the front standard 27 by means of suitable springs 30 mounted on the bolts 29. Suitably pivoted on the front standard 27 is a cam lever 31 the cam portion of which is arranged to project through a slot 32 and engage the back of the front presser plate 28 so as to permit of the cam lever 31 being operated to force the front presser plate 28 forward against the action of the springs 30. The front standard 27 is also provided with headed presser rods 33 which pass through countersunk holes 34 in the front presser plate 28. The presser rods 33 are slidably mounted in the tubes 341 secured to the back of the front standard 27, each tube being provided with a suitable spring 35 which tends to force the presser rods 33 outward. The face of the front standard 27 is suitably recessed adjacent the open end of each of the tubes 34 so as to contain in each instance a small notched lever 36 pivoted to the front standard at one end and at the other end pivoted in each instance to a rod 37 which passes through a vertical slot in the front standard. A suitable spring 38 secured to the rod 37 is provided for keeping the notched portions of the lever 36 into engagement with a groove 39 on each of the presser rods 33 to prevent the same being pressed inward. If, however, the rod 37 is depressed, the notched levers 36 disengage the presser rods 33 and the same can be pressed inward against the action of the springs 35 until the outer ends of the presser rods are flush with the face of the front presser plate 28.

Secured to the bottom of the slide 26 is a rack 40 which is arranged to engage a small gear 41 secured to one end of a shaft 42 rotatably mounted in suitable bearing lugs 43 secured to the underside of the table. To the other end of the shaft 42 is secured a beveled gear 44 which meshes with a small beveled gear 45 secured to one end of a shaft 46 rotatably mounted in suitable bearing lugs 47 secured to the underside of the table. The other end of the shaft 46 is provided with a hand wheel 48 by means of which the shafts 42 and 46 are rotated to move the slide 26 and with it the front standard 27 and front presser plate 28 back and forth across the table.

The dove-tailed groove 25 is also provided with a rear slide 49 to the top surface of which is secured a rear standard 50 to which is secured a rear presser plate 51 by means of suitable bolts 52. The rear slide 49 is connected to one end of a locking lever 53 which is adapted to slidably pass through a hole in the slide 26 the free end of the lever 53 being notched and adapted to engage a movable catch 54 suitably supported in block 55 secured to the side of the table at the front end of the dove-tailed groove 25. The rear slide 49 is also connected to the end of the slide 26 by means of a flexible chain 56 the operation of which will be described later.

Suitably secured to the top of the table in line with each other, and on opposite sides of the dove-tailed recess 25, is situated directly back of the folder frames 8 side standards 57 open at their adjacent sides and provided in each instance with upper and lower grooves 58. Slidably mounted in the grooves 58 of each of the side standards is an open frame 59 to the outer end of which is secured in each instance a side presser plate 60. Each open frame 59 is pivoted to one arm of a bell crank lever 61 which is also pivoted to one end of a double link 62 which is pivoted to a short link 63 adjustably secured to an adjusting screw 64 mounted in the side standard 57. The other arm of each of the bell crank levers 61 is provided with a small elongated slot 65 which is arranged to engage a small pin 66 secured to a threaded sleeve 67 mounted on a threaded shaft 68 rotatably mounted at both ends in the standards 69 secured to the top of the table. The center of the shaft 68 is secured to a small gear 70 which is arranged to engage a rack 71 slidably mounted in the table and connected to a rod 72 the lower end of which is pivoted to a foot lever 73 pivoted near its center to the base of the table.

From the above description it will be seen that when the outer end of the foot lever 73 is pressed downward the rack 71 will operate to turn the shaft 68 and the right and left hand threaded sleeves 67 will move away from each other thereby forcing the long arms of the bell crank levers 61 apart, which acts as a toggle together with the links 62, to force the side presser plates toward each other at right angles to the path of movement of the front and back presser plates before described.

Suitably secured to the back of the table is a hollow overhanging top standard 74 to the opposite sides of the overhanging end of which are secured the top braces 75 the outer ends of which are secured to the table by means of bolts 76. The top braces 75 are each secured to the top of the side standards 57 and assist in retaining the same in position.

The overhanging end of the top standard 74 which overhangs the side presser plates 60, is arranged to movably support a plunger 77 which is adjustably connected to one end of a rod 78 to the other end of which is secured a top presser plate 79. The plunger 77 is provided with bearing lugs 80 which are pivotally connected to one arm of a bell crank lever 81 which is pivotally connected to one end of a link 82 the other end of which is pivotally connected to an adjustable lug 83 secured to the overhanging end of the top standard. The other arm of the bell crank lever 81 is provided with an elongated slot 84 which is arranged to engage a small pin 85 secured to one end of a rod 86, the lower end of which is pivoted to one end of a foot lever 87 pivoted near its center to the base of the table upon a shaft 88 to which the foot lever 73 is also pivoted.

From the above description it will be seen that when the outer end of the foot lever 87 is pressed downward the rod 86 will force the long arm of the bell crank lever 81 upward, which acts as a toggle together with the link 82, to force the top presser plate 79 downward.

The overhanging top standard 74 is provided with an adjustable stop 89 which is adapted to limit the backward movement of the rear standard 50.

$a$ designates a sheet of rubber having on one side a thin sheet of tin $b$ which adheres to the rubber and permits of the same being handled and worked while still in a plastic condition, and protects its surface during vulcanization. The sheet of rubber $a$ and its adhering layer of tin $b$ is cut so as to completely cover the top of a suitable core $c$, the top of which is provided, in the present instance, with two grooves $d$ in which are inserted small strips of rubber $e$, the sheet of rubber $a$ in the present instance forming the bottom of the battery jar.

$f$ designates a sheet of rubber having on one side a thin sheet of tin $g$ which adheres to the rubber and permits of the same being handled and worked while still in a plastic condition. The sheet of rubber $f$ and its adhering layer of tin $g$ is cut so as to completely cover the sides of the core $c$ to whatever height it is desired to make the jar. the sheet of rubber $f$ in the present instance forming the sides of the battery jar.

By referring to Fig. 6 it will be seen that the core $c$ provided with the sheet of rubber $a$ and strips of rubber $d$ has been placed upon the slide 26 in front of the presser plate 28 and in contact with the presser rods 33 which are held in extended position to prevent the front presser plate touching the rubber when pushing the core forward in the folding operation. It will also be seen that the sheet of rubber $f$ has been placed upon the shelves 15 secured to the folder frames 8 in back of the guide posts 16 so that the sheet of rubber $f$ faces toward the core $c$. When the sheet of rubber $f$ has been placed upon the shelves 15 as just described. it is necessary that the rollers 10 be centrally located on either side of the groove 25 so that when the hand wheel 48 is operated to move the front standard 27 forward the back side of the core $c$ will engage the middle portion of the sheet of rubber $f$ and on the further movement of the core $c$ pass between the two rollers 10 which act to fold the ends of the sheet of rubber $f$ about the sides of the core $c$. As the core $c$ is moved forward after engaging the sheet of rubber $f$ it comes in contact with and forces the sheet of rubber $f$ up against the back presser plate 51 the back standard 50 being held stationary by means of the latch 54 which engages the rod 53. After the sheet of rubber $f$ has been forced up against the back presser plate 51, the latch 54 is operated to release the same and as the core $c$ is forced inward the back presser plate moves freely along the dove-tailed groove 25. The back presser plate 51 is initially held stationary as just described to insure the sheet of rubber $f$ being uniformly folded over the back side and edges of the core $c$, and to press out all air between the rubber and back of core.

When the sheet of rubber $f$ has been folded about the sides of the core $c$ and the front side of the core has passed just beyond the rollers 10, the hand wheel 48 is operated to retract the slide 26 and with it the front presser plate 28 to the position shown in Fig. 8. To fold the ends of the sheet of rubber $f$ over the front side of the core $c$ the hand lever 24 is operated to move the roller 10 of the left hand folder toward the right, which acts to fold over the left hand end of the sheet of rubber $f$ as shown in Fig. 8. When the left hand end of the sheet of rubber $f$ has been folded over the front face of the core $c$ the hand lever 24 is operated to move the roller 10 of the right hand folder toward the left. which acts to fold over the right hand end of the sheet of rubber $f$ against the front face of the core $c$. The sheet of tin $g$ preferably does not extend to the left hand edge of the sheet of rubber $f$ so that the right hand edge of the sheet of rubber $f$ will overlap and stick to the left hand edge of the sheet of rubber $f$ which is made of sufficient length to so overlap when folded over the front of the core $c$ as just described.

When the right hand end of the sheet of rubber $f$ has been folded into position as just described, the hand lever 24 is operated to withdraw the roller 10 of the right hand folder. The rod 37 is then operated to release the presser rods 33 and the hand wheel 48 turned to force the front presser plate 28 up against the front side of the core $c$ which is forced backward against the back presser plate 51 until the same comes in contact with the stop 89. The foot levers 73 and 87 are then operated together with the cam lever 31 to force the front and side presser plates inward and the top presser plate downward, thereby applying pressure to the four sides and top of the sheets of rubber covering the core at one and the same time so as to firmly compress the sheets of rubber $a$ and $f$ and make a firm neat union between the edges of the sheet of rubber $a$ and the top edge of the sheet of rubber $f$ and also between the overlapping edges of the sheet of rubber $f$.

When the hand wheel 48 has been turned to force the front pressure plate into position as just described, so as to apply pressure to the sheets of rubber covering the core the same is held in such position by means of a ratchet wheel 90 and a pawl 91, to permit of the cam lever 31 being operated.

After the sheets of rubber have been compressed about the core pressure is relieved from the foot levers 73 and 87, the pawl 91 is raised and the hand wheel 48 operated to withdraw the front presser plate 28 the flexible chain 56 acting to pull forward the presser plate 51 so that the core covered by the compressed sheets of rubber can be removed from the table.

After the sheets of rubber have been compressed upon the core as above described the same is suitably vulcanized in a suitable vulcanizing furnace, after which the core is removed and the sheets of tin stripped off of the surface of the rubber so completing a battery jar that is far superior to one made by hand.

In order to prevent the rollers 10 on the folder frames 8 engaging the sheet of rubber $f$ when the rollers are moved backward into retracted position after folding over the ends of the sheet of rubber $f$ each folder frame 8 is provided with a pivoted catch 95 which is adapted to engage a projecting lug 96 on the end of the bracket 6. The outer end of the catch 95 is provided with a suitable roller 97 which is adapted to engage a projection 98 and a projection 99 on the top brace 75 at the end of its inward movement which forces the folder frame outward against the action of springs 100 the catch 95 engaging the projecting lug 96 to hold the folder frame outward as shown in Fig. 4. When the folder frame is moved rearwardly the roller 97 is arranged to engage a spring pressed stop 101 which draws the catch 95 out of engagement with the lug 96 against the action of a spring 102 the springs 100 acting to bring the folder frame back into alinement as shown in Fig. 3.

When the folder frame is moved forward, the roller 97 engages the inclined side of the stop 101, pressing the same inward against the action of a spring 103 which keeps the folder frame in alinement as shown in Fig. 3, in which position it is arranged to fold over the end of the sheet of rubber $f$ a suitable pin 104 being provided for keeping the folder frame in alinement.

The object of moving the folder frame outward as shown in Fig. 4 is to prevent the roller 10 pulling the rubber over the corner of the core on its return movement thereby insuring a smooth and even corner.

While the invention has been described with particular reference to the details of construction, the same is not to be considered as limited thereto, as many changes can be made and still fall within the scope of the invention set forth in the following claims.

What I claim is:—

1. A machine for making battery jars and similar articles out of hard rubber, comprising in combination a core arranged to hold on its top surface a sheet of rubber in a plastic condition, and means for folding another sheet of rubber in a plastic condition about the sides of said core in contact with the edges of the sheet of rubber on the top of said core.

2. A machine for making battery jars and similar articles out of hard rubber, comprising in combination a core arranged to hold on its top surface a sheet of rubber in a plastic condition, means for folding another sheet of rubber in a plastic condition about the sides of said core in contact with the edges of the sheet of rubber on the top of said core, and means for applying pressure to the sides and top of said core to firmly unite all the contacting edges of said rubber sheets.

3. A machine for making battery jars and similar articles out of hard rubber, comprising in combination a core arranged to hold on its top surface a sheet of rubber in a plastic condition, means for folding another sheet of rubber in a plastic condition about the sides of said core in contact with the edges of the sheet of rubber on the top of said core and means for applying pressure simultaneously to the sides and top of said core to firmly unite all the contacting edges of said rubber sheets.

4. A machine for making battery jars and similar articles out of hard rubber comprising in combination a core arranged to hold on its top surface a sheet of rubber in a plastic condition, and means for folding another sheet of rubber in a plastic condition about the sides of said core in contact with the edges of the sheet of rubber on the top of said core, and means for overlapping the ends of the sheet of rubber on the sides of said core.

5. A machine for making battery jars and similar articles out of hard rubber comprising in combination, a core arranged to hold on its top surface a sheet of rubber in a plastic condition, means for folding another sheet of rubber in a plastic condition about the sides of said core in contact with the edges of the sheet of rubber on the top of said core, and means for overlapping the ends of the sheet of rubber on the sides of said core, and means for applying pressure to the sides and top of said core to firmly unite all the contacting edges of said rubber sheets.

6. A machine for making battery jars and similar articles out of hard rubber comprising in combination a core arranged to hold on its top surface a sheet of rubber in a plastic condition, means for folding another sheet of rubber in a plastic condition about the sides of said core in contact with the edges of the sheet of rubber on the top of said core, and means for overlapping the ends of the sheet of rubber on the sides of said core, and means for applying pressure simultaneously to the sides and top of said core to firmly unite all the contacting edges of said rubber sheets.

7. A machine for making battery jars and similar articles out of hard rubber comprising in combination a folder for folding a sheet of rubber in a plastic condition about the sides of a core.

8. A machine for making battery jars and similar articles out of hard rubber comprising in combination a folder for folding a sheet of rubber in a plastic condition about the sides of a core and means for operating said folder to overlap the ends of said sheet of rubber.

9. A machine for making battery jars and similar articles out of hard rubber comprising in combination a folder for folding a sheet of rubber in a plastic condition about the sides of a core provided on its top surface with another sheet of rubber in a plastic condition and a plurality of presser plates for applying pressure to the top and sides of said core.

10. A machine for making battery jars and similar articles out of hard rubber comprising in combination a folder for folding a sheet of rubber in a plastic condition about the sides of a core, means for operating said folder to overlap the ends of said sheet of rubber and means for disengaging said folder from contact with said sheet of rubber on its return movement.

11. A machine for making battery jars and similar articles out of hard rubber comprising in combination a folder comprising folder frames, rollers supported by said folder frames for folding a sheet of rubber in a plastic condition about the sides of a core.

12. A machine for making battery jars and similar articles out of hard rubber comprising in combination a core having on its top surface a sheet of rubber in a plastic condition, a folder arranged to hold another sheet of rubber in a plastic condition, and means for moving said core in relation to the sheet of rubber on said folder.

13. A machine for making battery jars and similar articles out of hard rubber comprising in combination a core having on its top surface a sheet of rubber in a plastic condition, a folder arranged to hold another sheet of rubber in a plastic condition, means for moving said core and means for moving said folder to fold the sheet of rubber on said folder about said core.

14. A machine for making battery jars and similar articles out of hard rubber comprising in combination a core having on its top surface a sheet of rubber in a plastic condition, a folder arranged to hold another sheet of rubber in a plastic condition, a front presser plate for moving said core into contact with the sheet of rubber on said folder to fold said sheet of rubber about the sides of said core and means for operating said folder to overlap the ends of said sheet of rubber.

15. A machine for making battery jars and similar articles out of hard rubber comprising in combination a core having on its top surface a sheet of rubber in a plastic condition, a folder arranged to hold another sheet of rubber in a plastic condition, a back presser plate, a front presser plate, for pressing said core into contact with the sheet of rubber on said folder and pressing it against said back presser plate, means for moving said front and back presser plates, and means for operating said folder to overlap the ends of said sheet of rubber.

16. A machine for making battery jars and similar articles out of hard rubber comprising in combination a core having on its top surface a sheet of rubber in a plastic condition, a folder arranged to hold another sheet of rubber in a plastic condition, a back presser plate, a front presser plate for pressing said core into contact with the sheet of rubber on said folder and pressing it against said back presser plate, means for moving said front and back presser plates, means for operating said folder to overlap the ends of said sheet of rubber, side and top presser plates and means for operating said front, top and side presser plates to compress the rubber sheets on said core to firmly unite all the contacting edges of said rubber sheets.

In testimony whereof I have signed this specification in the presence of two subscribing witnesses.

WILLIAM W. WEITLING.

Witnesses:
HOWARD A. DODD,
EMIL K. JOHNSON.